W. Newcomb.
Saw Gummer.

N° 87,191. Patented Feb. 23, 1869.

Witnesses
Ernest F. Hastenhuber
Chas Wahlers

Inventor:
Wm Newcomb
Van Santvoord & Hauff
Attys.

WILLIAM NEWCOMB, OF JOHNSONVILLE, NEW YORK.

Letters Patent No. 87,191, dated February 23, 1869.

IMPROVEMENT IN SAW-GUMMER.

The Schedule referred to in these Letters Patent and making part of the same.

*To all whom it may concern:*

Be it known that I, WILLIAM NEWCOMB, of Johnsonville, in the county of Rensselaer, in the State of New York, have invented a new and improved Saw-Gummer; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

This invention consists in the arrangement of a burr, mounted on a shaft, which has its bearing in a radius-arm, to which a vibrating motion is imparted by a worm and worm-wheel, acting on a pinion, which gears into a segmental rack in such a manner, that, by imparting to said burr a revolving motion, it also receives an automatic feed-motion in the required direction, and the operation of gumming a saw can be performed with ease and facility.

The invention consists also in combining, with the radius-arm carrying the burr, a supporting-plate, which is provided with screw-clamps, and with a gauge, in such a manner that the burr can be readily adjusted in the required position in relation to the saw-tooth to be gummed.

A represents a supporting-plate, of sheet-metal or any other suitable material.

Figure 2:
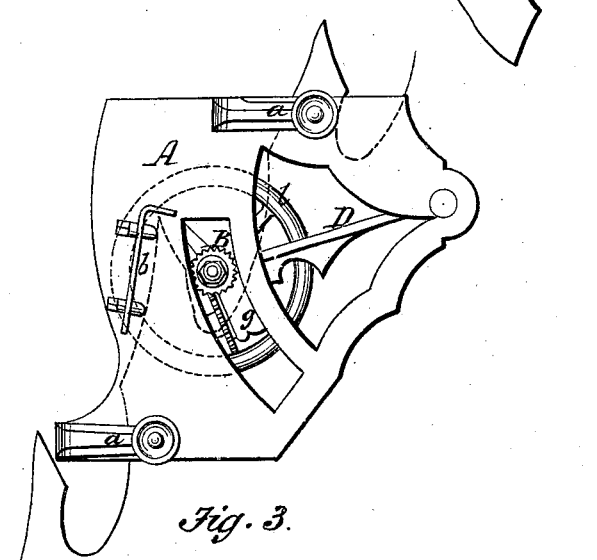
Figure 2 is a rear elevation thereof.

This plate is provided with two or more screw-clamps, $a$, and with a gauge, $b$, so that said plate can be secured in the proper position on the saw to be gummed, as clearly shown in fig. 2 of the drawing, where the saw is represented in red outlines.

The gauge $b$, in this example, consists of two set-screws, which bear on the edge of the tooth, but said gauge may be constructed in any other desirable manner.

The operation of gumming is effected by a burr, B, which is mounted on the end of a shaft, C.

This shaft has its bearing in a radius-arm, D, which is connected to the supporting-plate A, by means of a pivot, $c$, so that it can freely swing in either direction.

Figure 1:
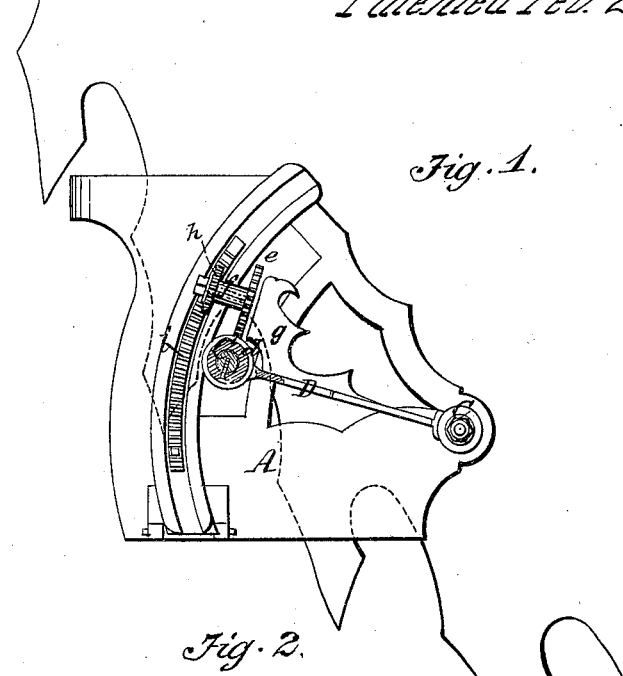
Figure 1 represents a sectional front elevation of this invention.

On the shaft C is mounted a worm, $d$, which gears in a worm-wheel, $e$, mounted on a shaft, $f$, that has its bearing in a bracket, $g$, secured to the radius-arm D, (see fig. 1;) and on the end of the shaft $f$ is fastened a pinion, $h$, which gears into a segmental rack, $i$.

This rack is connected to the supporting-plate A, by a hinge-joint, $j$, (see fig. 3,) and it is subjected to the action of a spring, $k$, which serves to keep said rack in gear with the pinion $h$.

Figure 3:
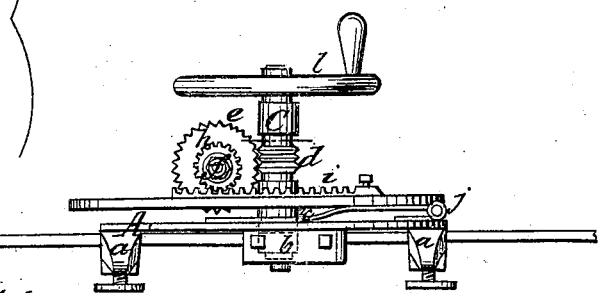
Figure 3 is an end view of the same.

When the supporting-plate has been adjusted on the saw-plate in the proper position, the shaft C is turned, by means of a hand-wheel, $l$, mounted on it, as shown in fig. 3, and as the burr begins to act on the tooth of the saw, it receives an automatic feed-motion, by the action of the worm, worm-wheel, pinion, and segmental rack, and thereby the operation of gumming the saw is effected with ease and facility.

It is obvious that my saw-gummer is applicable to saws of any description.

Having thus described my invention,

What I claim as new, and desire to secure by Letters Patent, is—

The arrangement of the swinging arm D, worm-shaft C $d$, shaft $f$, with wheel $e$ and pinion $h$, the rack-bar and the plate A, provided with clamps $a$ and gauge $b$, all operating substantially as herein set forth, for the purpose specified.

WM. NEWCOMB.

Witnesses:
LEVI CLAPPER,
NAHUM NEWCOMB.